United States Patent [19]

Arai

[11] 4,271,715

[45] Jun. 9, 1981

[54] TRANSMISSION EQUIPPED WITH AUXILIARY SPEED CHANGING GEAR

[75] Inventor: Hajime Arai, Aichi, Japan

[73] Assignee: Toyota Jidosha Kogyo Kabushiki Kaisha, Toyota, Japan

[21] Appl. No.: 31,135

[22] Filed: Apr. 18, 1979

[30] Foreign Application Priority Data

Jul. 4, 1978 [JP] Japan .................................. 53/81239

[51] Int. Cl.³ ............................................. F16H 3/08
[52] U.S. Cl. ........................................ 74/360; 74/359
[58] Field of Search ................. 74/357, 358, 359, 360, 74/361, 331

[56] References Cited

U.S. PATENT DOCUMENTS

| | | | |
|---|---|---|---|
| 3,173,303 | 3/1965 | Galaniuk | 74/359 X |
| 3,600,963 | 8/1971 | Portmann | 74/360 |
| 4,000,662 | 1/1977 | Wolfe | 74/360 X |

FOREIGN PATENT DOCUMENTS 1501674  2/1978  United Kingdom ...................... 74/360

*Primary Examiner*—C. J. Husar
*Assistant Examiner*—Frank McKenzie

*Attorney, Agent, or Firm*—Cushman, Darby & Cushman

[57] ABSTRACT

A transmission having an auxiliary speed changing gear. The auxiliary speed changing gear has two pairs of meshing gears each of which being adapted to transmit the torque of an input shaft coaxial with an output shaft to and intermediate counter gear shaft. The gear pairs include an input gear for high speed range and an input gear for low speed range, respectively. These input gears are rotatably mounted on the input shaft and are adapted to be selectively brought into the torque transmitting engagement by a spline hub and a cooperating sleeve which are carried by the input shaft. The arrangement is such that, when the input gear for the low speed range is selected by the combination of the spline hub and sleeve, the gears of main transmission such as first, second and third gears are operated at low speed range, while, when the input gear for high speed range is selected, the gears of the main transmission are operated at high speed range. The transmission as a whole is simple, light weight, small-sized and less expensive as compared with conventional transmission having auxiliary speed changing gear, and can be produced without requiring any specific production technique and material.

3 Claims, 9 Drawing Figures

FIG. I

TRANSMISSION EQUIPPED WITH AUXILIARY SPEED CHANGING GEAR

BACKGROUND OF THE INVENTION

The present invention relates to a transmission equipped with an auxiliary speed changing gear.

The transmission of the kind mentioned above is usually used in such a heavy-duty vehicle having an engine the output power of which is relatively small for the heavy load of the vehicle, in order to ensure a sufficiently high running performance of such vehicle.

Most ordinary construction of the transmission of this type has a main transmission the gear ratio of which can be changed over 3 to 5 stages, and auxiliary speed changing gear of 2 to 3 stages and connected in series to the main transmission. Various types of auxiliary speed changing gears have been known such as those incorporating planetary gears or counter gears.

However, in the conventional transmissions having an auxiliary speed changing gear, the weight of the transmission as a whole, as well as the space occupied by the transmission, is impractically large, because the auxiliary speed changing gear and the main transmission are arranged and installed independently of each other.

At the same time, the cost of the transmission as a whole is considerably high, as compared with the commonly used transmission having no auxiliary transmission.

For these reasons, the transmission having an auxiliary speed changing gear could not be successfully used in small vehicles such as passenger cars, due to the restrictions in weight, size and cost, although it has been practically used in large size heavy-duty vehicles for industrial purposes.

In order to make the minimized fuel consumption rate and the sufficiently high running performance compatible with each other, over various running modes including expressway-cruising, running across traffic snarl in the street, hill-climbing and downing in the mountainous areas, the number of speed changing ratios to be performed by the transmission has to be as large as 6 to 10. The shifting operation with the transmission having such a large number of speed changing ratios is extremely troublesome.

In case of passenger cars, the output power of the engine is sufficiently large, so that the transmission gear may be shifted at each two stage, i.e. skipping over the adjacent stage.

SUMMARY OF THE INVENTION

Under these circumstances, the present invention aims at providing a multistage transmission having a high and low speed ranges of speed changing, such that each of the gears of the transmission, e.g. the first gear, second gear and so forth can be operated at the selected one of the high speed and low speed ranges. Thus, for cruising of the passenger car on expressway or the like smooth road, the high speed range is selected so that each gear is operated at its high speed range, whereas, for the running across the traffic snarl which requires repeated starting and stopping, as well as for the running along rolling and winding roads in the mountainous areas, the low speed range is selected so that each gear may be operated at its low speed range. Thus, the transmission is usually fixed at either one speed range of high or low speed, and the gear shifting operation is made in the same way as in the ordinary 3 to 5 stage transmission. It will be seen that such an arrangement of the transmission will ensure a good running performance and a reduced fuel consumption rate, without being accompanied by deterioration of maneuverability.

It is therefore an object of the invention to provide a less expensive and lightweight transmission having an auxiliary speed changing gear, which can be installed even on small-sized vehicles having limited installation space, without necessitating any specific manufacturing and processing technique and material.

To this end, according to the invention, there is provided a transmission having an auxiliary speed changing gear, wherein the auxiliary speed changing gear includes two pairs of gears each of which being adapted to transmit the torque from an input shaft coaxial with an output shaft to a counter gear shaft, the gear pairs including, respectively, a high speed range and a low speed range input gears rotatably mounted on the input shaft.

The above and other objects, as well as advantageous features of the invention will become more clear from the following description of the preferred embodiments taken in conjunction with the accompanying drawings.

BRIEF EXPLANATION OF THE DRAWINGS

FIGS. 2 to 8 are skeleton diagrams of gear trains of the transmission as shown in FIG. 1 in which:

FIG. 2 illustrates the neutral state of gear trains in the low speed range,

FIG. 3 illustrates the state of gear trains when a first gear is selected in the low speed range, FIG. 4 illustrates the state of gear trains when a second gear is selected in the low speed range, FIG. 5 illustrates the state of gear trains when a third gear is selected in the low speed range, FIG. 6 illustrates the state of gear trains when a fourth gear is selected in the low speed range, FIG. 7 illustrates the neutral state of gear trains in the high speed range, FIG. 8 illustrates the state of gear trains when the fourth gear is selected in the high speed range.

DESCRIPTION OF THE PREFERRED EMBODIMENTS

Figure 1:
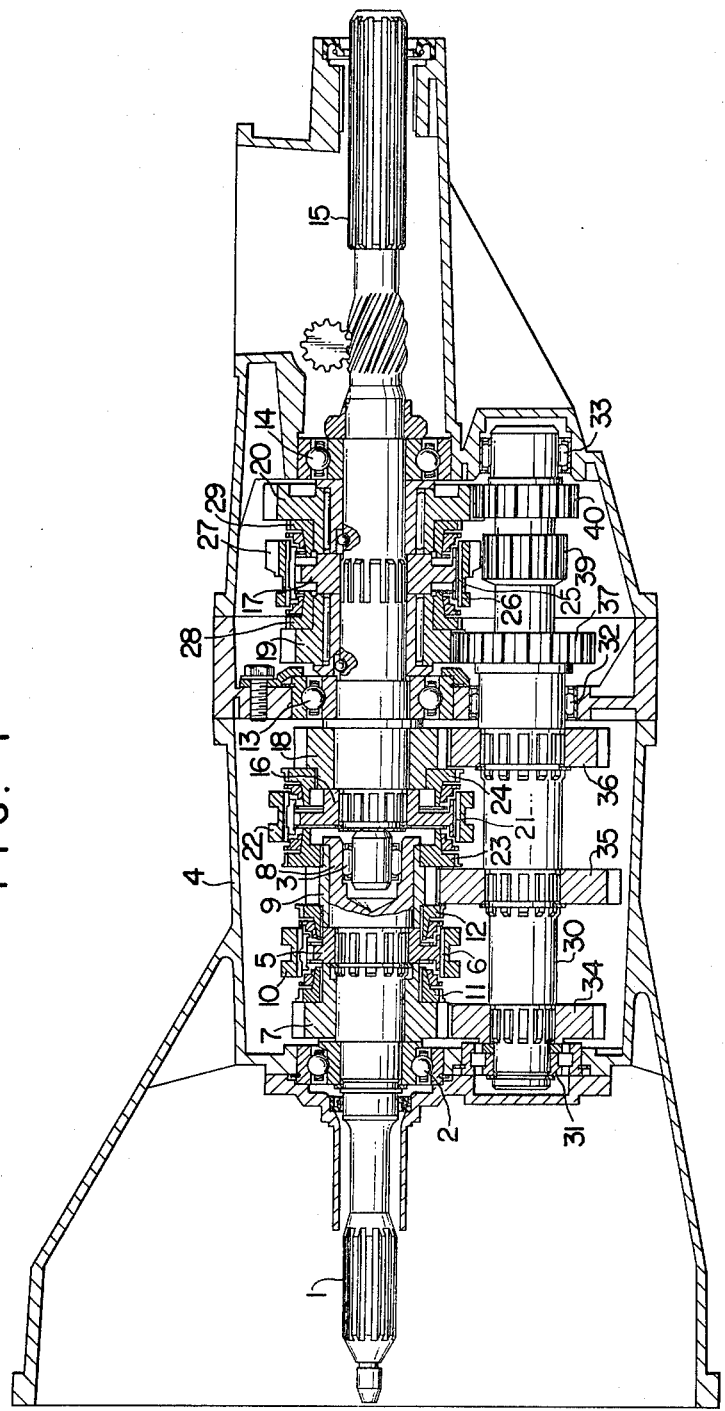
FIG. 1 is a sectional view of a transmission embodying the invention having an auxiliary speed changing gear.
Figure 2:
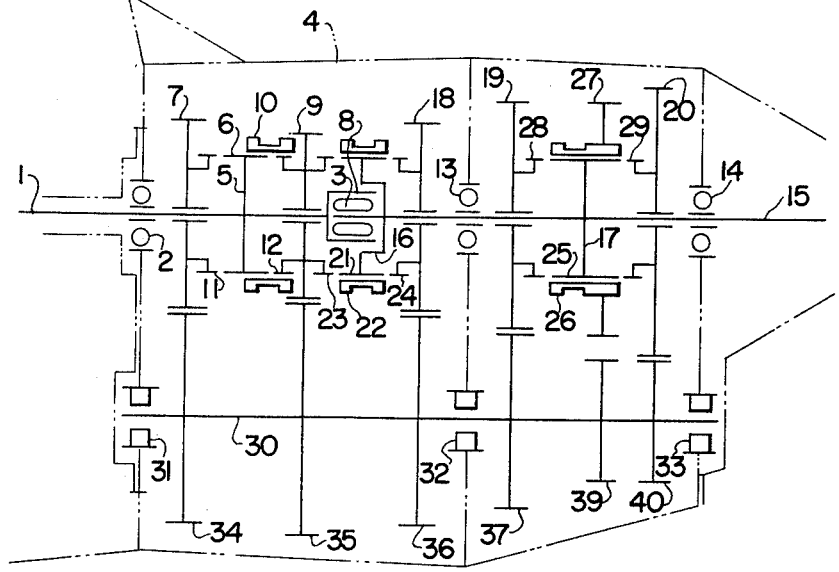

Referring to FIG. 1 showing in section a transmission of the invention, and also to FIG. 2 which is a skeleton diagram of the transmission, an input shaft 1 is carried by a bearing 2, a pilot bearing 3 and another pilot bearing (not shown) carried by the engine crank shaft, and is supported, through these bearings, by a transmission case 4.

A hub 5 is splined to the input shaft 1. An input gear 7 for high speed range is carried by a portion of the input shaft 1 between the bearing 2 and the hub 5. Similarly, an input gear 9 for low speed range is rotatably supported by the portion of the input shaft 1 between the shaft end 8 and the hub 5.

A spline 6 is formed on the outer peripheral surface of the hub 5. A range-switching sleeve 10 is splined to the spline 6, and is adapted to be moved in the axial direction along the spline 6, by a shift fork which is not shown.

The input gears 7 and 9 for the high and low speed ranges are provided with splines 11 and 12 for meshing with the sleeve 10 through the aid of a suitable synchronization mechanism which are neglected from the drawings.

An output shaft 15, which is coaxial with the input shaft 1, is supported by the transmission case 4, through bearings 13 and 14. The output shaft 15 is supported at its one end by the pilot bearing 3, for free rotation in relation to the input shaft 1, and is connected at its other end to a propeller shaft through sleeves and other members which are not shown.

Hubs 16 and 17 are splined to the output shaft 15. A third gear 18 is rotatably disposed between the hub 16 and the bearing 13. Similarly, a second gear 19 and a first gear 20 are rotatably disposed between the bearing 13 and the hub 17, and the hub 17 and the bearing 14, respectively.

A spline 21 is formed on the outer peripheral surface of the hub 16. A third-fourth change-over sleeve 22 is adapted to be moved axially along the spline 21, by means of a shift fork not shown. The low speed range input gear 9 and the third gear 18 are provided with splines 23 and 24 for meshing with the sleeve 22 through the aid of a synchronizing mechanisms.

A spline 25 is formed on the outer peripheral surface of the hub 17. A first-second change-over sleeve 26 is adapted to be moved axially along the spline 25, by means of a shift fork which is not shown. A reverse gear 27 is formed unitarily with the sleeve 26. The second gear 19 and the first gear 20 are provided with spline 28 and 29 for meshing with the sleeve 26, along with synchronizing mechanisms.

A counter gear shaft 30 is disposed to extend in parallel with the input and output shafts 1 and 15, and is carried by the transmission case 4 through three bearings 31, 32 and 33. The counter gear shaft carries the following 6 (six) gears 34, 35, 36, 37, 39 and 40 unitarily or by means of splines, such that these gears may rotate unitarily with one another.

The high speed range input gear 7 is meshing with a high speed range driven gear 34, while the low speed range input gear 9 is meshing with a low speed range driven gear 35. A third counter gear 36, second counter gear 37 and a first counter gear 40 are meshing with the third, second and the first gears 18, 19 and 20, respectively. A counter reverse gear 39 is adapted to be selectively engaged by the reverse gear, through a reverse idler gear which is not shown, as the reverse idler gear is slidingly moved.

The operation of the transmission of the invention having above described construction will be described hereinafter, for both of low speed and high speed ranges.

(1) Operation in Low Speed Range

FIG. 2 schematically shows the auxiliary speed changing gear switched for the low speed range operation. The main transmission has, as will be clear also from the foregoing description, four stages of ahead gears and a single stage of reverse gear. In FIG. 2, the transmission is shown in the neutral state of the transmission. FIGS. 3, 4, 5 and 6 show the states of the transmission in which the first, second, third and the fourth gears of the main transmissions are selected, respectively.

The rotation of the input shaft is transmitted to the low speed range input gear 9, through the hub 5 and the sleeve 10. Consequently, the low speed range driven gear 35 and, accordingly, the counter gear shaft 30 are rotated at a speed which is reduced by the ratio of numbers of gear teeth of the meshing gears. As the counter gear shaft 30 rotates, the first counter gear 40, second counter gear 37, third counter gear 36 and the counter reverse gear 39, which are unitary with or splined to the counter gear shaft 30, drive the corresponding meshing gears, i.e. the first gear 20, second gear 19 and the third gear 18.

Figure 3:
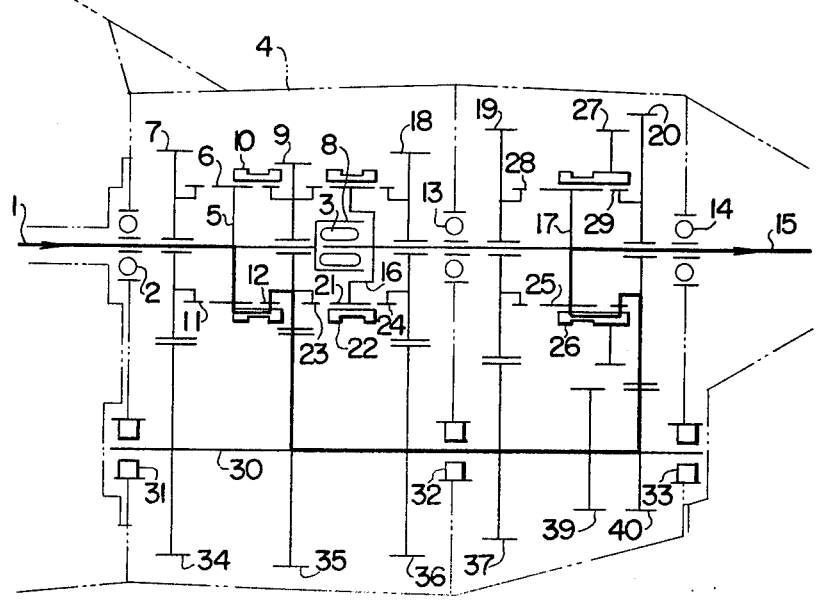
Figure 4:
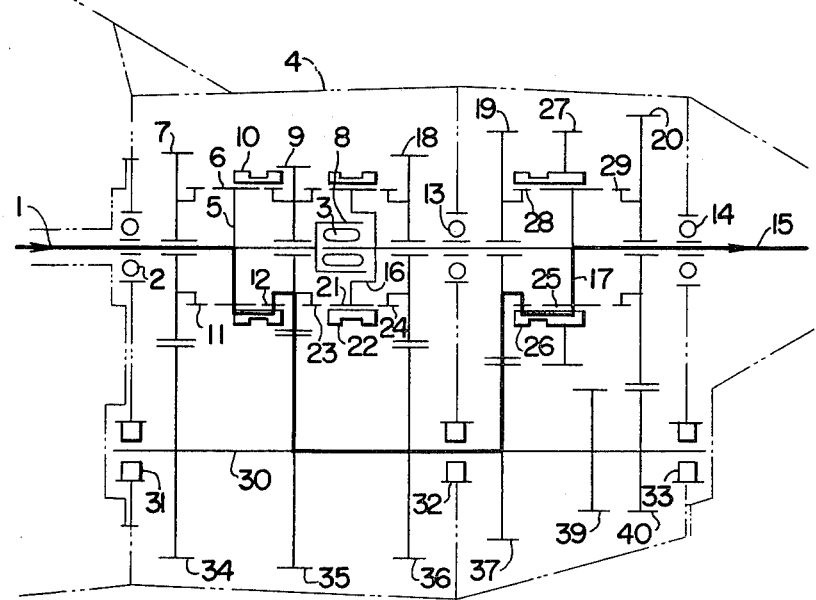
Figure 5:
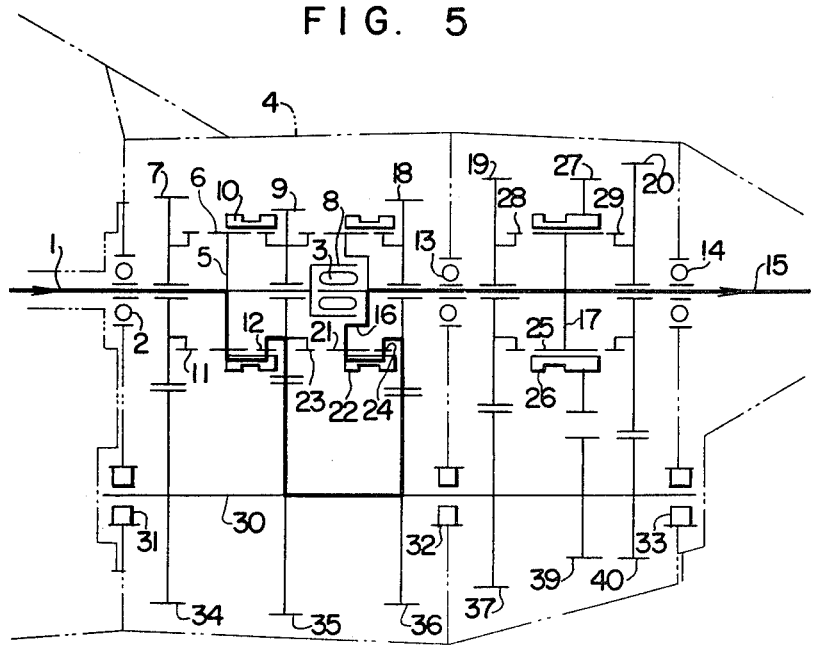

It will be seen from FIGS. 3, 4 and 5 that the torque-transmitting connection is established between the input shaft 1 and the output shaft 15, at the first, second or third gear ratio, as the sleeves 22, 26, which are rotating unitarily with the hubs 16 and 17 connected to the output shaft 15, are slided toward the first, second and third gears.

Figure 6:
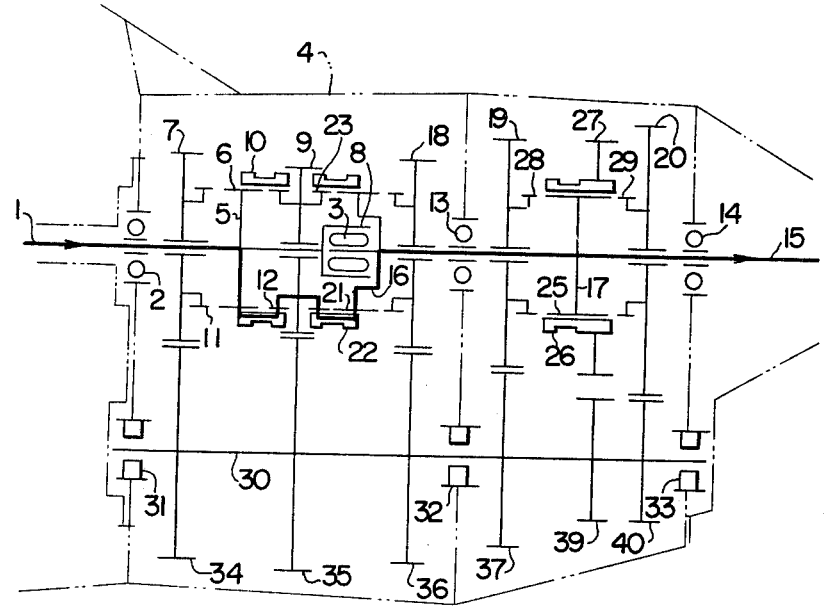

At the same time, as the sleeve 22 is slided toward the input shaft 1, the input shaft 1 is brought into direct connection with the output shaft 15, through the hub 5, sleeve 10, spline 12, and through the spline 23, sleeve 22 and the hub 16, so that the rotation of the input shaft 1 is transmitted to the output shaft 15 and both shafts are rotated as if they are unitary, as will be seen from FIG. 6.

(2) Operation in High Speed Range

Figure 7:
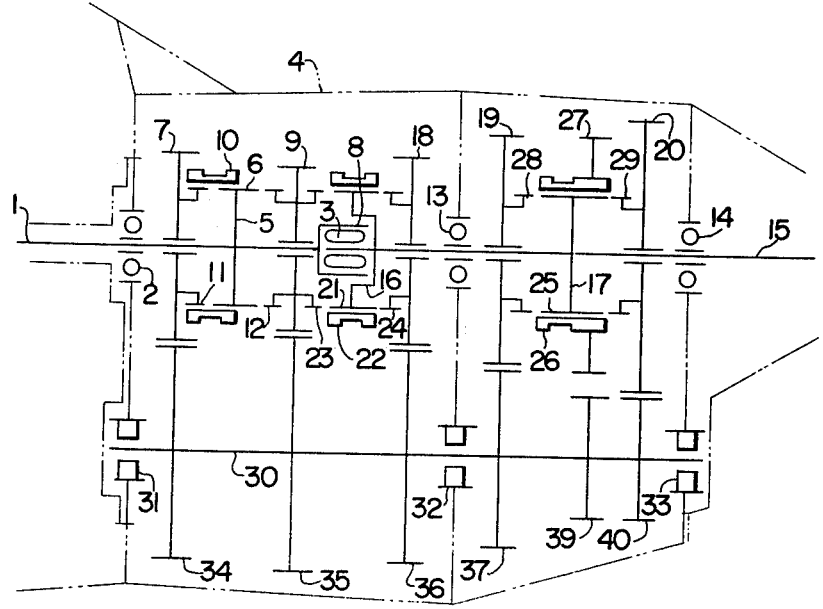

FIG. 7 shows the same transmission as that of FIGS. 1 to 6, but in the state in which the auxiliary speed changing gear has been switched for the operation in the high speed range. The gear shifting is made in the same manner as that in the low speed range. The rotation of the input shaft 1 is transmitted to the high speed range input gear 7, through the hub 5 and the sleeve 10. Consequently, the meshing driven gear 34 for high speed range and, accordingly, the counter gear shaft 30 are rotated at a speed which is reduced by the ratio of numbers of gear teeth of the meshing gears.

In this case, however, the reduction gear ratio is smaller than that of the low speed range, so that the counter gear shaft 30 is rotated at a speed higher than that in the low speed range operation, for a given rotation speed of the input shaft. The power transmission from the counter gear shaft 30 to the output shaft 15 is made in the same manner as that in the low speed range operation.

Figure 8:
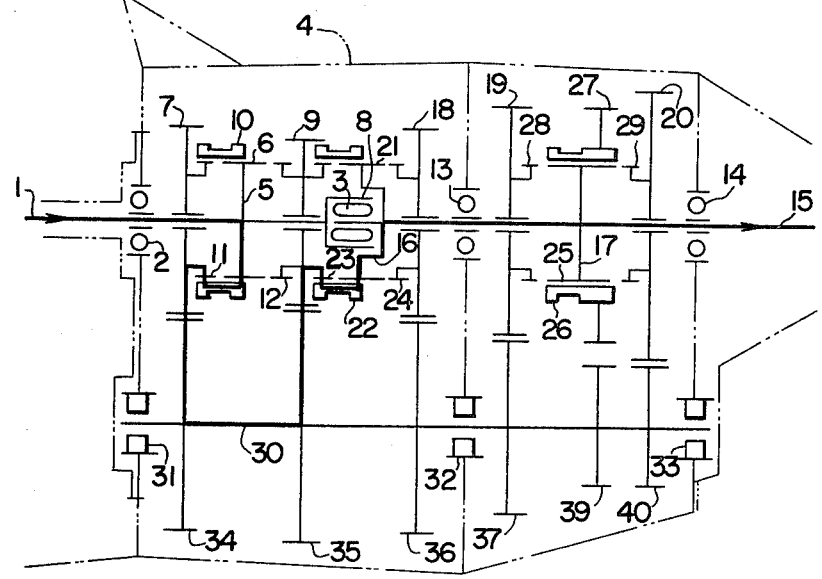

When the fourth gear is selected, the sleeve 22 slides to the position as shown in FIG. 8, so that the rotation of the counter gear shaft 30 is transmitted in the reverse manner to the low speed range input gear 9, through the driven gear 35 for the low speed range. Consequently, the output shaft 15 is rotated at an over-speed gear ratio.

A typical example of the reduction gear ratios of the transmission in accordance with the invention is shown in the following Table 1.

TABLE 1

| | Example of Reduction Gear Ratios | | | | |
|---|---|---|---|---|---|
| | Input shaft → Counter gear shaft | | Counter gear shaft → output shaft | Gear ratios of transmission | |
| | Low speed range | High speed range | | Low speed range | High speed range |
| 1st | 1.50 | 1.05 | 2.67 | 4.00 | 2.80 |
| 2nd | ↑ | ↑ | 1.53 | 2.30 | 1.61 |
| 3rd | ↑ | ↑ | 0.97 | 1.45 | 1.02 |
| 4th | — | ↑ | 0.67 | 1.00 (direct) | 0.70 |
| Reverse | 1.50 | ↑ | 2.84 | 4.26 | 2.99 |

Figure 9:
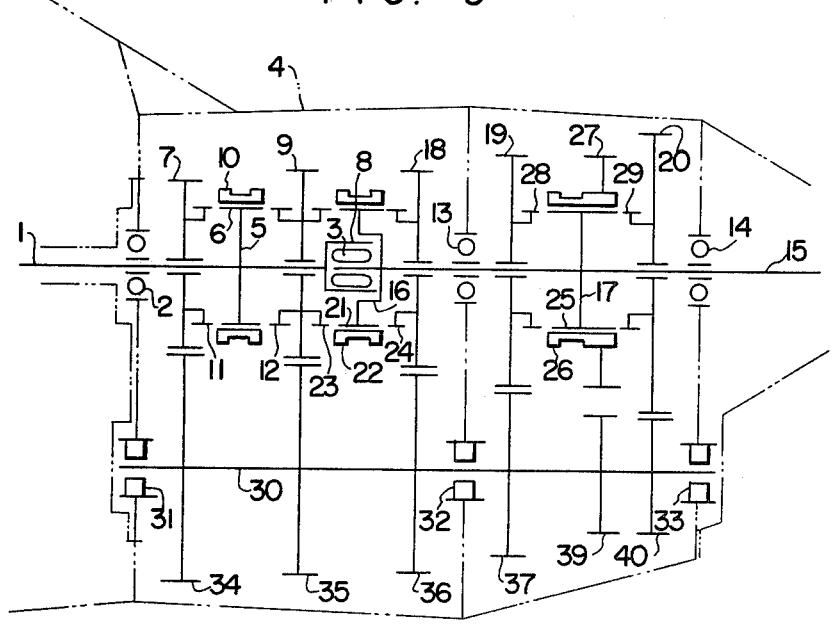
FIG. 9 is a skeleton diagram of another embodiment of the invention.

FIG. 9 shows another embodiment, in which the high speed range input gear and the low speed range input gear of the first embodiment are substituted by each other. This arrangement of gears also can be used as a transmission, although the reduction gear ratios are quite different from those of the first embodiment. Namely, this transmission has gear ratios which are much larger than those of the first embodiment, including the largest one which can be used as an emergency low. Thus, this transmission can be used as an under drive transmission having 8 (2×4) gear ratios, if the gear ratios are selected as shown in the following Table 2.

TABLE 2

| | Example of Reduction Gear Ratio | | | | |
|---|---|---|---|---|---|
| | Input → Counter | | | Reduction gear ratios | |
| | Low speed range | High speed range | Counter ↓ Output | Low speed range | High speed range |
| 1st | 1.50 | 1.05 | 3.33 | 5.00 | 3.50 |
| 2nd | ↑ | ↑ | 2.10 | 3.15 | 2.21 |
| 3rd | ↑ | ↑ | 1.33 | 2.00 | 1.40 |
| 4th | ↑ | / | 0.952 | 1.43 | 1.00 (direct) |
| Reverse | ↑ | 1.05 | 3.33 | 3.00 | 3.50 |

As has been described, according to the invention, there is provided a transmission having two gear pairs each of which being adapted to transmit the rotation of an input shaft to a counter gear shaft, one of the gear pairs including an input gear for high speed range, while the other of the gear pairs including an input gear for low speed range, the input gears being rotatably mounted on the input shaft. Thus, it is possible to double the number of reduction gear ratios of the conventional transmission having no auxiliary speed changing gear, by simply adding a pair of gears, without incurring the substantial increment of the installation space.

At the same time, the transmission in accordance with the invention having an auxiliary speed changing gear can be designed and manufactured without requiring any specific technique material and processing method and, accordingly, at a low cost, because it can be constructed simply by adding a pair of gears to the conventional transmission.

What is claimed is:

1. In a multiple speed transmission having an output shaft, a countershaft and pairs of meshing gears mounted on said shafts with the gears on the countershaft being non-rotatably mounted thereon and the gears on the output shaft being selectively rotatable or non-rotatable therewith, the combination of auxiliary speed changing gear means comprising:

an input shaft coaxial with the output shaft; at least two pairs of meshing gears mounted on said input shaft and on the countershaft, each pair being adapted to transmit torque from said input shaft to the countershaft, one of said pairs including an input gear for high-speed range and the other of said pairs including an input gear for low-speed range, the gears of each of said pairs on the countershaft being non-rotatably mounted thereon, and the gears of each of said pairs on said input shaft being selectively rotatable or non-rotatable therewith.

2. The combination defined in claim 1 wherein the auxiliary speed changing gear means includes a spline hub and a sleeve carried by the input shaft and adapted to cooperate with each other in selectively connecting one of the input gears for rotation with the said input shaft, said input gears being rotatably mounted on said input shaft on opposite sides of said spline hub.

3. The structure defined in claim 1 including means for selectively disconnecting or connecting the output shaft to the gear on the input shaft adjacent thereto for direct drive of the output shaft by said input shaft when said gear is rotatable with said input shaft and the other of the gears on said input shaft is non-rotatable therewith.

* * * * *